W. C. STEVENS.
FABRIC TEARING DEVICE.
APPLICATION FILED NOV. 26, 1913.
1,134,293.
Patented Apr. 6, 1915.
6 SHEETS—SHEET 1.
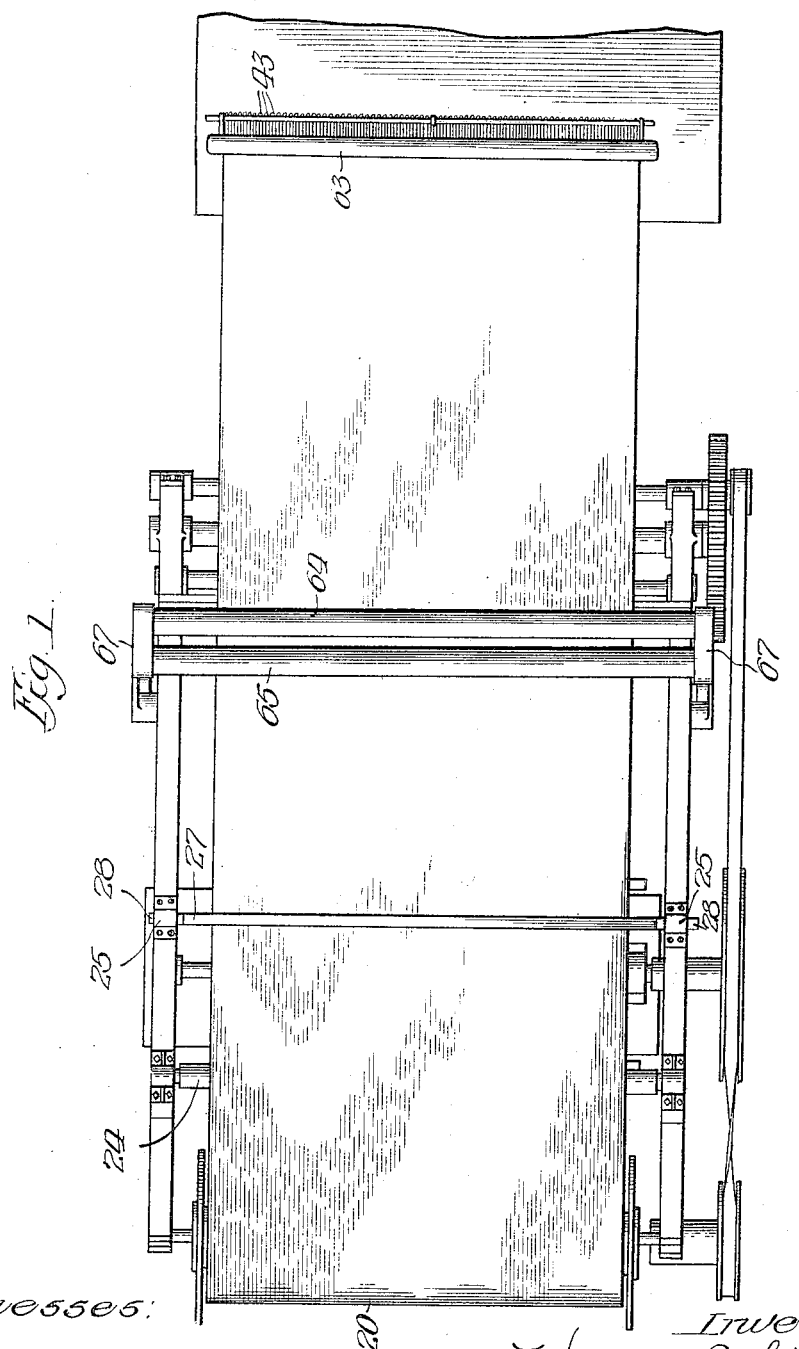

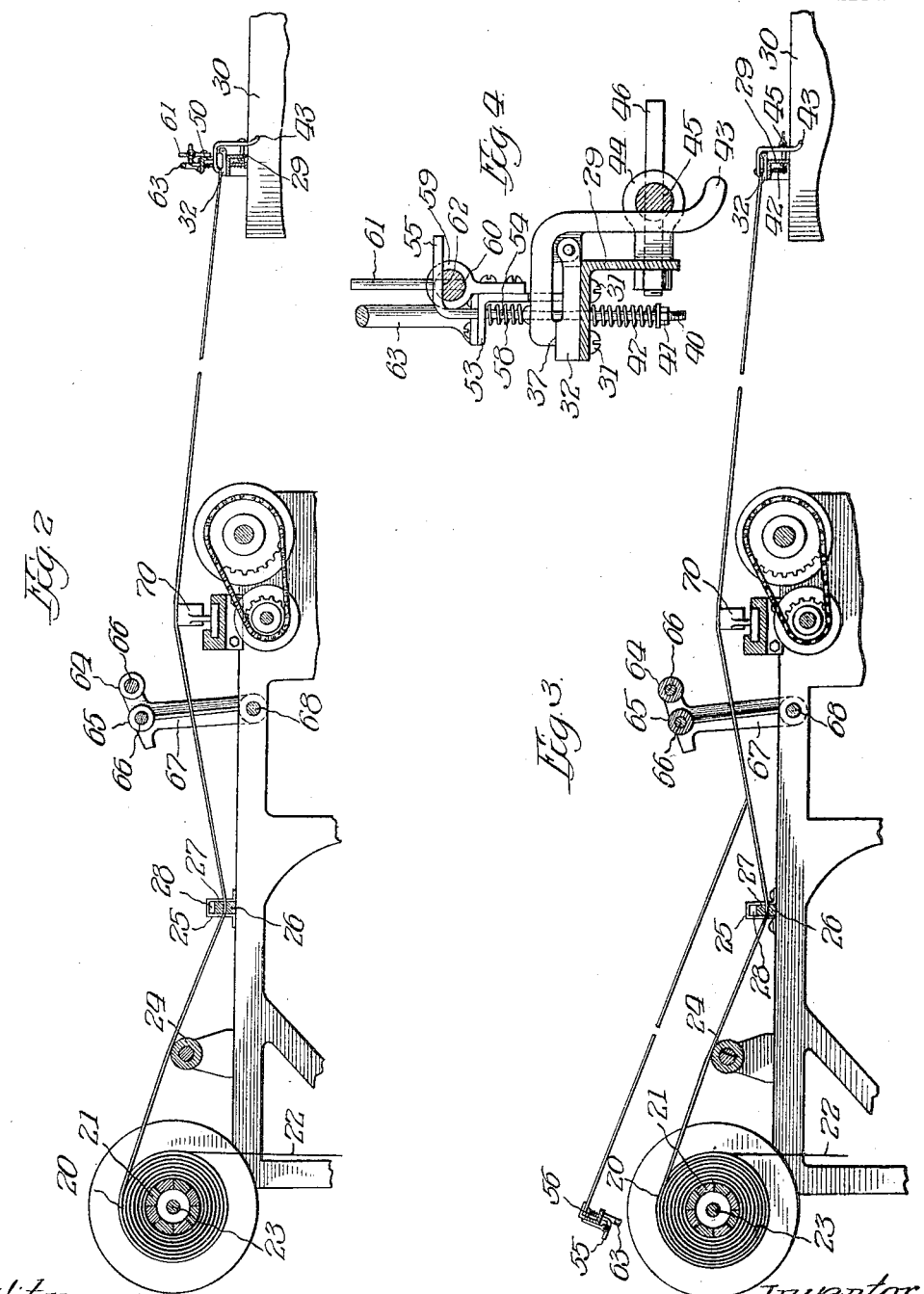

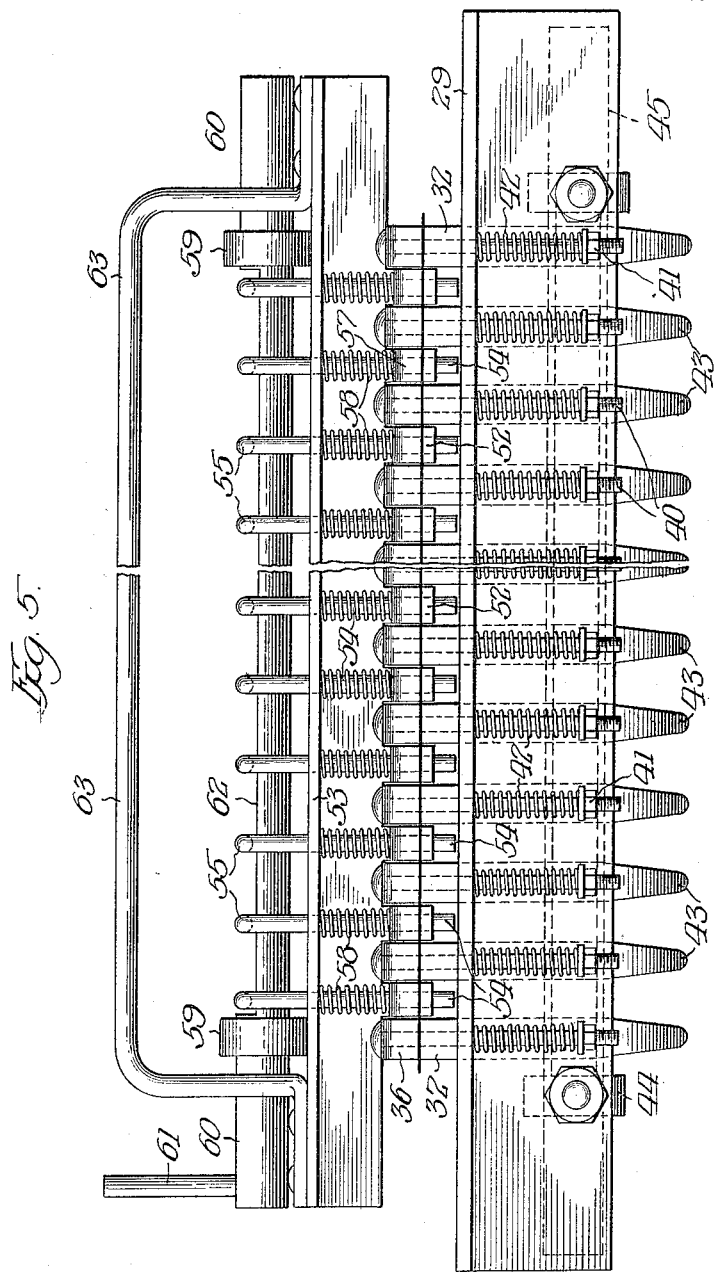

W. C. STEVENS.
FABRIC TEARING DEVICE.
APPLICATION FILED NOV. 26, 1913.
1,134,293.
Patented Apr. 6, 1915.
6 SHEETS—SHEET 4.
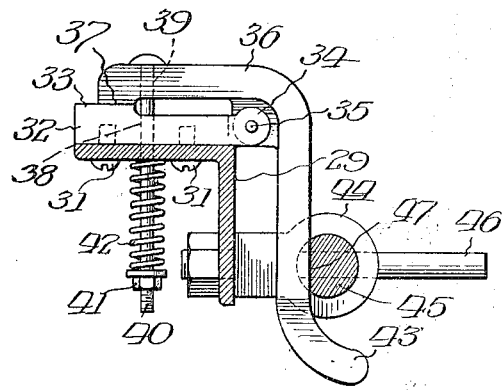
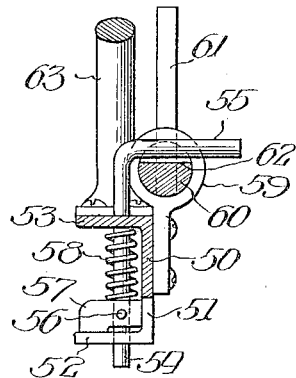
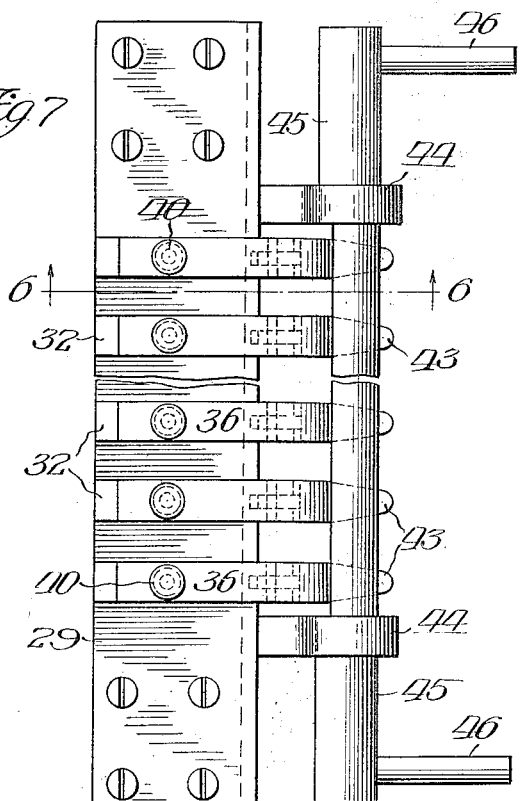
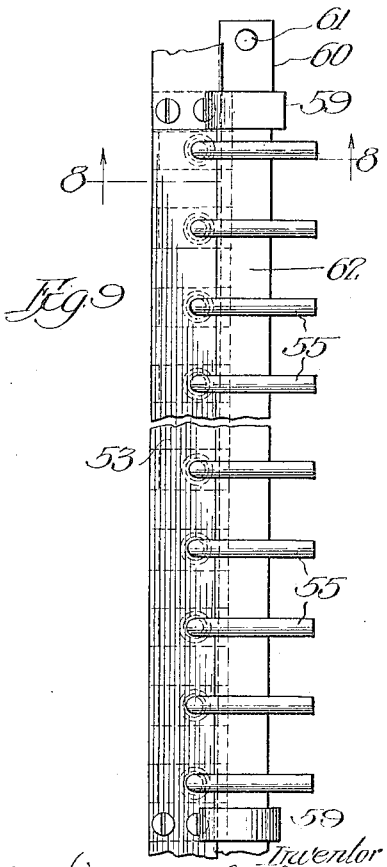
Witnesses:
Inventor
William C. Stevens

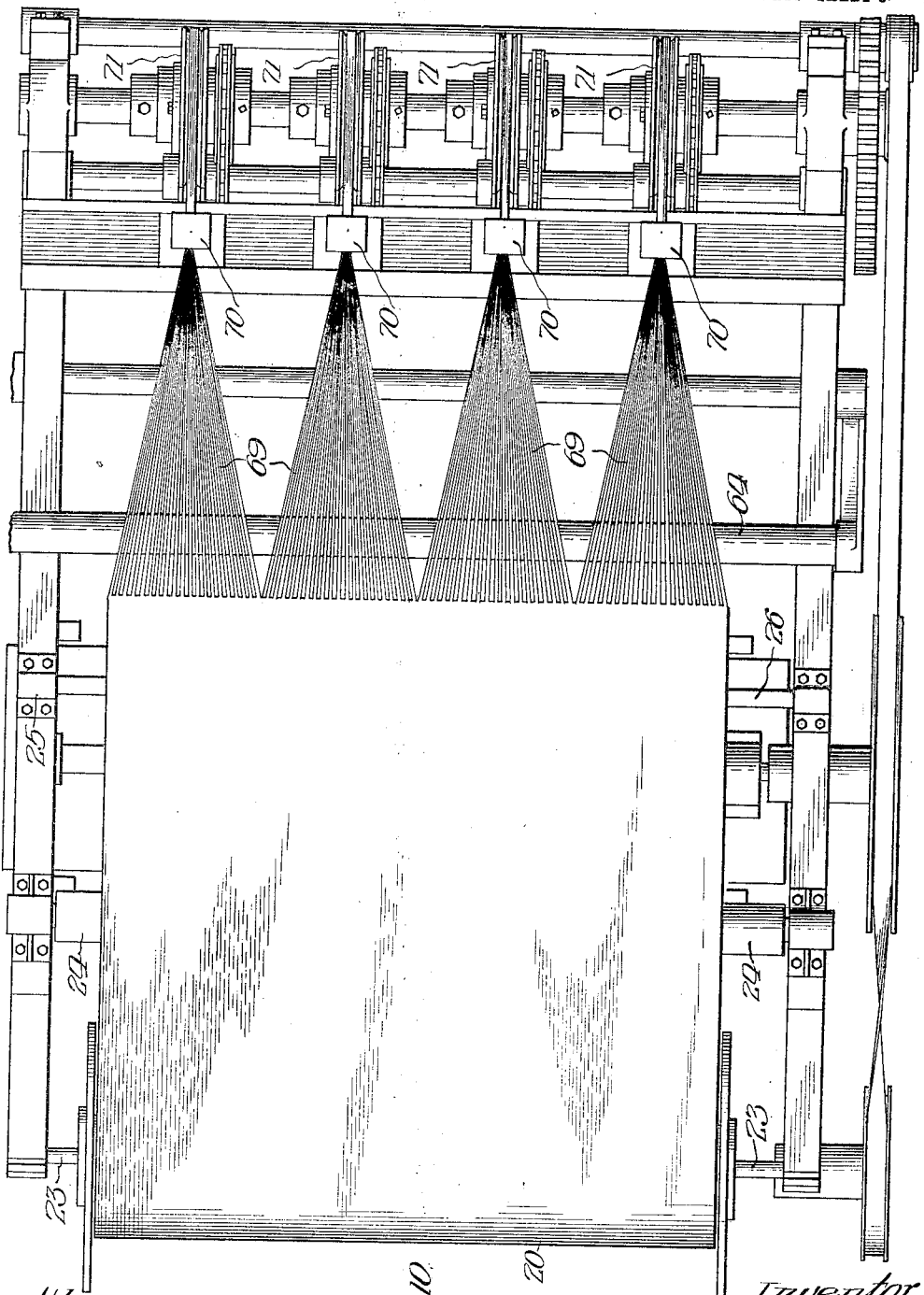

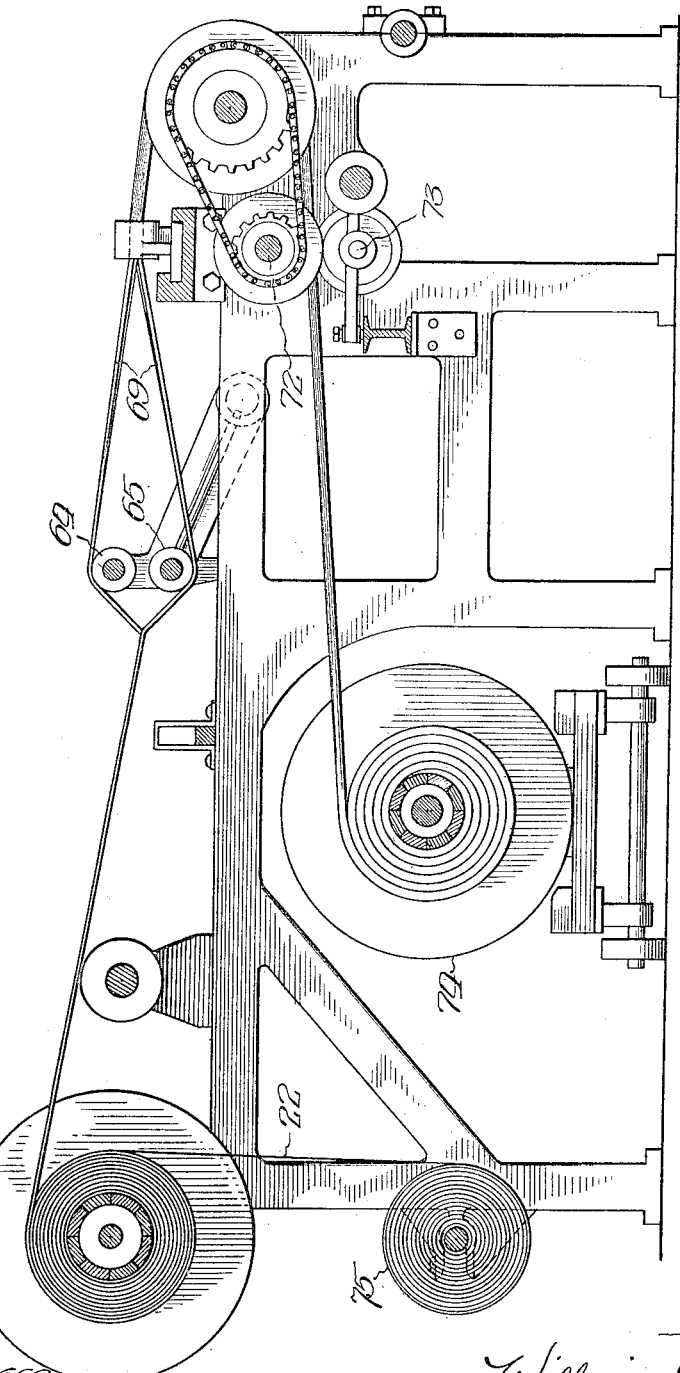

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

FABRIC-TEARING DEVICE.

1,134,293. Specification of Letters Patent. Patented Apr. 6, 1915.

Application filed November 26, 1913. Serial No. 803,137.

*To all whom it may concern:*

Be it known that I, WILLIAM C. STEVENS, a citizen of the United States, residing at Akron, in the county of Summit and State of Ohio, have invented certain new and useful Improvements in Fabric-Tearing Devices, of which the following is a specification.

In my copending patent application, Serial No. 737,934, I have set forth a machine for making the beads employed on the sides of pneumatic tire casings or shoes to provide the clencher attachment feature. In such machine a comparatively wide stock of rubber-impregnated fabric is divided into a multitude of relatively narrow strips and these are gathered up into groups and formed by suitable means into a plurality of continuous bodies shaped in cross section substantially like that of the finished beads. This rubber-charged cloth or fabric is ordinarily somewhat unusual in that it is composed of a comparatively large number of relatively strong longitudinal threads and a few separated cross threads so that the fabric can be readily torn into the required number of longitudinal narrow strips, in this way doing away with the cutting of the fabric.

My present invention relates to means for initially or preliminarily starting such longitudinal tearing of the fabric into a large number of strips ready for threading through the bead making machine set forth in such copending application, it being understood that after the machine is once started with the tearing initiated the further tearing takes place automatically and uninterruptedly. It should be clear therefore that the present invention relates only to the initial tearing preparing the fabric for further tearing in the bead making machine.

In order that those skilled in this art may have a full and complete understanding of this invention I have illustrated a preferred embodiment of the same in the accompanying drawings and in order that the relation of this apparatus to the bead making machine may be readily understood I have also illustrated so much of the machine as is necessary for this purpose.

In these drawings—Figure 1 illustrates the tearing device associated with the bead making machine; Fig. 2 shows the appliance in section with the tearing mechanism applied to the front edge of the cloth and ready to tear the advanced portion of the fabric into strips; Fig. 3 illustrates the manner in which this tearing is effected; Fig. 4 shows in cross section the coöperation of the two parts of the tearing mechanism; Fig. 5 is an elevation of the mechanism shown in Fig. 4; Fig. 6 is a cross section through one of the fabric gripping devices on line 6—6 of Fig. 7; Fig. 7 is a plan view of the construction illustrated in Fig. 6; Fig. 8 is a cross section through the companion fabric gripping device on line 8—8 of Fig. 9; Fig. 9 is a plan view of the device illustrated in Fig. 8; Fig. 10 is a plan view of the bead making machine illustrating the automatic tearing of the fabric after the machine has been threaded up subsequent to the preliminary tearing referred to; and Fig. 11 is a vertical longitudinal section through the mechanism shown in Fig. 10.

The roll of rubber-impregnated cloth or fabric 20 comes to the machine wound on a drum 21 with the usual cloth liner 22 between the convolutions of the more or less sticky fabric. Such drum or spool is suitably supported in any approved manner at one end of the machine, as for instance on the shaft or rod 23. The workman takes the front end of the fabric, draws it forwardly over a laterally acting stretching roller 24 of the usual type and draws the front end of the fabric over beyond the right hand end of the machine, as shown in Fig. 2. At each side of the machine a bracket 25 is provided which accommodates the pair of bars 26 and 27, the one below and the other above the cloth, as is clearly shown. These two bars are caused to firmly grip and hold the cloth by means of wedges 28 temporarily driven into each of the brackets 25 above the bars.

The preliminary fabric tearing device constituting the subject matter of this patent application is composed of two parts, the lower device being illustrated in Figs. 6 and 7, the companion upper device being shown in Figs. 8 and 9, while the two parts associated together are illustrated in Figs. 4 and 5.

The lower device includes an angle bar 29 which may be suitably supported in any approved manner beyond the end of the bead making machine, as shown in Fig. 2, on the table 30 or standards, posts, or equivalent means. At intervals corresponding to the spacings of alternate strips of the torn fabric I fasten to the top flange of the angle bar 29 by means of screws 31, a plurality of blocks 32 each substantially equal in width to that of the strips of fabric to be torn. Each of such blocks has a flat upper surface 33 at one end and at its other end a pair of apertured arms 34, 34 for the accommodation of a pivot pin 35 on which is fulcrumed a finger 36 of general right angle conformation, these fingers being equal in width to that of the blocks 32. In order that the forward flat end surfaces 37 of such fingers may adequately grip the edge of the cloth when interposed between the surfaces 33 and 37, each of the blocks 32 and its corresponding gripping finger 36 are apertured in alinement at 38 and 39 for the accommodation of a downwardly projecting bolt 40 between the nut 41 of which and the bottom face of the horizontal flange of the angle bar there is interposed a coil spring 42 which, as will be readily understood, acts upon the finger 36 to yieldingly pull the same downwardly into fabric gripping position. Each of the fingers 36 has a bent lower end 43 upon which pressure may be applied to rock the finger around its fulcrum pin 35 and away from the block 32 so as to receive or release the fabric if such individual operation of the finger seems desirable or necessary. When the advance edge of the fabric is to be inserted between the blocks 32 and the fingers 36 it is, of course, desirable to elevate all the fingers simultaneously and also to lower them into fabric gripping position simultaneously. In order that this may be effected I fasten to the outer face of the depending vertical flange of the angle bar 29 the bearings 44 in which a shaft 45 is accommodated and adapted to turn, such turning being effected by manipulation of either one of the outstanding handles 46, 46. The side of this shaft next to the angle bar 29 is flattened at 47 against which flattened surface the faces of the depending portions of the fingers 36 bear. When the handles 46 are in the position shown in Figs. 6 and 7, then the fingers 36 are enabled to grasp the edge of the fabric inserted between their ends and the blocks 32. In order to permit such insertion, however, the operator by turning the shaft 45 by means of one of the handles 46 can simultaneously elevate all of the fingers 36 rocking them on their fulcrums so as to provide adequate space between the fingers and the blocks 32. Upon turning the handle 46 back the shaft resumes its normal position and the fingers are permitted to grasp the fabric.

The upper fabric-gripping device illustrated in Figs. 8 and 9 and also in association with the lower device in Figs. 4 and 5, is composed of a channel bar 50 cut away or slotted at intervals at 51 for the accommodation in such slots of the blocks 32 and fingers 36, the spaced projecting flanges 52 formed by such slotting corresponding in distance apart to the space between the blocks 32 and also corresponding in width to such spaces so that these flanges or fingers 52 may be readily received between the blocks 32, as is clearly illustrated in Fig. 5. The spaced flanges or fingers 52 and the top flange 53 of the channel bar 50 are apertured in alinement for the accommodation of rods 54, each having an outwardly bent upper end 55. Above each foot or flange 52 the corresponding rod 54 has fastened thereto by a pin 56 a finger 57 pressed downwardly toward the flange by a coil spring 58 accommodated between the finger and the flange 53 of the channel bar.

The web of the channel bar 50 has fastened thereto a pair of bearings 59, 59, for the reception of a shaft 60 equipped with a handle 61, such shaft being flattened at 62 beneath the ends 55 of the rods 54.

As will be obvious, when the handle 61 is in the position indicated in Figs. 8 and 9 all of the fingers or pressure blocks 57 are down engaging the corresponding feet 52 under the action of the individual springs 58. If it is desired to raise any one of these fingers this can be readily accomplished by lifting the end 55 against the action of the corresponding spring 58. In order to lift all of the fingers 57 simultaneously it is merely necessary to rock the shaft 60 by manipulation of the handle 61. The reverse movement of such handle will, of course, cause the shaft to turn back and under the action of the springs 58 all of the fingers will be depressed at the same time. In order that this upper fabric-gripping member may be readily moved to effect the tearing operation it is provided with a loop handle 63 by which it may be readily carried.

Assuming that the fabric has been unrolled from the stock roll 20 sufficiently to bring its advance end to the tearing mechanism at the right hand portion of Fig. 2 of the drawings and that the fabric or cloth has been gripped between the two bars 26 and 27 by the action of the wedges, the operator depresses one of the handles 46 thereby rocking the shaft 45 and elevating all of the fingers 36 whereupon the advance edge of the cloth is laid on the spaced blocks 32 and then the shaft 45 is rocked back into normal position so that all of the fingers 36 grip the edge of the fabric at intervals between themselves and their coöperating blocks 32. Then the operator takes the upper fabric gripping device, rocks the shaft 60 by means of the handle 61 so as to elevate all of the sliding fingers 57 and then associates this upper gripping device with the lower one so that the feet or flanges 52 will be beneath the edge portion of the fabric and between the blocks 32. Then he rocks the shaft 60 so that all of the fingers 57 descend gripping between themselves and their corresponding abutments or flanges 52 all of the ungripped edge-portions of the cloth between the blocks 32. The workman then carries the upper gripping device by means of the handle 63 rearwardly toward the stock roll 20, as illustrated in Fig. 3, and in doing so tears all of that portion of the fabric between the bars 26, 27 and the lower gripping device into strips or shreds in width the same as that of the blocks 32 and flanges 52. This tearing operation is easily brought about because the transverse threads of the fabric are comparatively weak while the longitudinal threads are relatively strong. Then the pair of rollers 64, and 65, revoluble on the rods 66, 66, connecting together the two arms 67 fulcrumed at 68 at the two sides of the machine are swung down into the position shown in Fig. 11 so that the torn strands fastened to the lower gripping device are beneath the roller 65, it being understood that the tearing accomplished by the movement of the upper gripping device rearwardly toward the stock roll is rendered uniform and is limited in extent by the action of the bars 26 and 27 to prevent tearing of the fabric beyond their position. The upper gripping device with the torn tapes or strands still grasped thereby is carried over the roller 64, as shown in Fig. 11. Both gripping devices are now released from the fabric by turning their shafts, thereby simultaneously raising all the gripping fingers, and the torn strips 69 are gathered into groups (four in the present instance) each group consisting of a portion of the strips passing beneath the roller 65 and a portion of the strips passing over the roller 64. These groups thus brought together are threaded through forming dies or collectors 70, passed around grooved forming wheels 71, and coöperating and forming wheels on shafts 72 and 73 to the bead drums or spools 74. Then bars 26 and 27 are removed. During the operation of the machine after thus being threaded with the fabric preliminarily torn, owing to the fact that a portion of the strips of fabric are above the roller 64 and the remaining portion below the roller 65, the tearing occurs automatically, the strands are gathered into groups, shaped into the form of beads, and wound up on the spools 74, the liner 22 from the stock roll being wound up on its drum 75 as is customary.

The operation of the bead making machine need not be further described, the present invention residing solely in the tearing mechanism described and those parts of the bead making machine coöperating therewith during the preliminary tearing.

It might be remarked that my improved fabric tearing device is only used occasionally when it is necessary to re-thread the bead making machine. In the ordinary operation of the latter when one stock roll of fabric is exhausted and another one placed on the machine the advance end of the fabric of the latter may be stuck to the rear end of the former thereby eliminating the necessity of re-threading the machine in the manner described in detail above.

To those skilled in this art it will be obvious that various minor mechanical changes may be made in the structure herein described and illustrated without departing from the heart and substance of the invention and without sacrificing any of its substantial benefits and advantages.

I claim:

1. In a fabric gripping device, the combination of an abutment, and a series of fingers spaced apart a distance substantially equal to their width and adapted to grasp the edge portion of a fabric sheet at intervals between themselves and said abutment, whereby to hold and leave free alternate edge portions of the cloth, substantially as described.

2. In a fabric gripping device, the combination of an abutment, and a series of spring-pressed fingers spaced apart and adapted to grasp the edge portion of a fabric sheet at intervals between themselves and the said abutment, and other means movable relative to the fingers and adapted to grasp the cloth between said fingers, substantially as described.

3. In a fabric gripping device, the combination of an abutment, a series of fingers spaced apart and adapted to grasp the edge portion of a fabric sheet at intervals between themselves and said abutment, means to operate a plurality of said fingers simultaneously, and other means movable relative to the fingers and adapted to grasp the cloth between said fingers, substantially as described.

4. In a fabric gripping device, the combination of an abutment, a series of independently operable fingers spaced apart a distance substantially equal to their width and adapted to grasp the edge portion of a fabric sheet at intervals between themselves and said abutment, whereby to hold and leave free alternate edge portions of the cloth, and means to simultaneously operate a plurality of said fingers, substantially as described.

5. In a device of the character described, the combination of a first fabric gripping device adapted to grasp the edge portion of a fabric sheet at intervals, and a second fabric gripping device movable relatively to the first gripping device to tear the fabric and adapted to grasp the edge portions of the fabric sheet ungrasped by said first gripping device, substantially as described.

6. In a device of the character described, the combination of a fabric gripping device comprising an abutment, a series of fingers spaced apart and adapted to grasp the edge portion of a fabric sheet at intervals between themselves and said abutment, and a second fabric gripping device movable relatively to said first gripping device and comprising an abutment, and a series of fingers spaced apart and adapted to grasp the edge portion of said fabric sheet between those portions grasped by the first fabric gripping device, substantially as described.

7. In a device of the character described, a first fabric gripping device having members adapted to grasp the edge portion of a fabric sheet at intervals, a second fabric gripping device having members adapted to grasp the edge portions of the fabric sheet ungrasped by said first device, said second device being movable relatively to said first device to effect the fabric tearing operation, and means to operate the members individually and collectively, substantially as described.

8. In a device of the character described, the combination of a first fabric gripping device comprising an abutment, a series of spring-pressed fingers spaced apart and adapted to grasp the edge portion of a fabric sheet at intervals between themselves and said abutment, and means to retract a plurality of said fingers simultaneously, a second fabric gripping device movable relatively to said first device to effect the fabric tearing operation and comprising an abutment, a series of spring-pressed fingers spaced apart and adapted to grasp the edge portions of said fabric sheet between the portions grasped by said first gripping device, and means to retract a plurality of said fingers simultaneously, substantially as described.

In testimony whereof I have hereunto signed my name in the presence of two subscribing witnesses.

WILLIAM C. STEVENS.

Witnesses:
J. J. SHEA,
V. M. GREER.

Copies of this patent may be obtained for five cents each, by addressing the "Commissioner of Patents, Washington, D. C."